United States Patent
Conrad et al.

(10) Patent No.: US 10,234,075 B2
(45) Date of Patent: Mar. 19, 2019

(54) NON-ROTATING FLEXURE BEARINGS WITH ENHANCED DYNAMIC STABILITY FOR CRYOCOOLERS AND OTHER DEVICES

(71) Applicant: Raytheon Company, Waltham, MA (US)

(72) Inventors: Theodore J. Conrad, Redondo Beach, CA (US); Robert D. Schaefer, Huntington Beach, CA (US); Andrew L. Bullard, Manhattan Beach, CA (US); Brian R. Schaefer, Huntington Beach, CA (US); Ryan Yates, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 12 days.

(21) Appl. No.: 15/426,451

(22) Filed: Feb. 7, 2017

(65) Prior Publication Data

US 2018/0224059 A1 Aug. 9, 2018

(51) Int. Cl.
*F16F 13/00* (2006.01)
*F16M 13/02* (2006.01)
(Continued)

(52) U.S. Cl.
CPC ............ *F16M 13/02* (2013.01); *F16C 29/002* (2013.01); *F16C 35/00* (2013.01); *F16C 35/02* (2013.01);
(Continued)

(58) Field of Classification Search
CPC ...... F16F 13/14; F16F 1/387; B60G 2204/41; B60G 7/02; B60G 2204/4104
(Continued)

(56) References Cited

U.S. PATENT DOCUMENTS

| 2,407,757 A | 9/1946 | MacCallum | |
| 5,031,885 A * | 7/1991 | Schwerdt | F16F 1/371 248/609 |

(Continued)

FOREIGN PATENT DOCUMENTS

| DE | 7015469 U | 8/1972 |
| EP | 1798441 A1 | 6/2007 |

(Continued)

OTHER PUBLICATIONS

International Search Report and Written Opinion of the International Searching Authority for PCT Patent Application No. PCT/US2017/055512 dated Jan. 5, 2018, 12 pages.

(Continued)

*Primary Examiner* — Steven M Marsh

(57) ABSTRACT

A system includes a device, a support structure, and a flexure bearing configured to connect the device to the support structure. The flexure bearing includes an outer hub and an inner hub, where the hubs are configured to be secured to the support structure and to the device. The flexure bearing also includes multiple sets of flexure arms connecting the outer hub and the inner hub, where each set of flexure arms includes symmetric flexure arms. The flexure bearing further includes multiple bridges, where each bridge connects one of the flexure arms in one set of flexure arms to one of the flexure arms in an adjacent set of flexure arms.

20 Claims, 4 Drawing Sheets

(51) Int. Cl.
*F25B 9/14* (2006.01)
*F16C 35/00* (2006.01)
*F16C 35/02* (2006.01)
*F16C 29/00* (2006.01)
*F16F 1/32* (2006.01)

(52) U.S. Cl.
CPC ............... *F16F 1/326* (2013.01); *F25B 9/14* (2013.01); *F16C 2362/52* (2013.01); *F25B 2309/001* (2013.01)

(58) Field of Classification Search
USPC .................. 248/603, 604; 267/140.12, 141.2
See application file for complete search history.

(56) References Cited

U.S. PATENT DOCUMENTS

| | | | |
|---|---|---|---|
| 5,492,313 A | 2/1996 | Pan et al. | |
| 5,884,892 A | 3/1999 | Gassen et al. | |
| 5,920,133 A | 7/1999 | Penswick et al. | |
| 6,286,650 B1 | 9/2001 | Tabushi et al. | |
| 6,371,461 B1 * | 4/2002 | Stahl | F16F 1/3863 267/140.12 |
| 6,585,222 B2 | 7/2003 | Ihara et al. | |
| 7,748,689 B2 * | 7/2010 | Thibault | F16F 1/3807 267/140.12 |
| 8,845,202 B2 | 9/2014 | Teimel | |
| 9,285,073 B2 | 3/2016 | Ellis et al. | |
| 2004/0239020 A1 * | 12/2004 | Ito | F16F 13/1409 267/140.12 |
| 2005/0242480 A1 * | 11/2005 | Nicholson | F16F 1/387 267/140.12 |
| 2013/0134641 A1 * | 5/2013 | Yanagi | F16F 1/3828 267/141.2 |
| 2015/0041619 A1 * | 2/2015 | Ellis | F16F 1/324 248/603 |

FOREIGN PATENT DOCUMENTS

| | | |
|---|---|---|
| FR | 2348058 A1 | 11/1977 |
| JP | H04 347460 A | 12/1992 |
| JP | H09312896 A | 12/1997 |
| JP | H11 201035 A | 7/1999 |
| JP | 2001304316 A | 10/2001 |
| JP | 2002357280 A | 12/2002 |
| JP | 2009264433 A | 11/2009 |
| WO | 2015020903 A1 | 2/2015 |

OTHER PUBLICATIONS

The International Searching Authority, "Internation Search Report," International Application No. PCT/US2014/049438, dated Nov. 18, 2014, 7 pages, publisher EPO, Rijswijk, NL.

* cited by examiner

NON-ROTATING FLEXURE BEARINGS WITH ENHANCED DYNAMIC STABILITY FOR CRYOCOOLERS AND OTHER DEVICES

TECHNICAL FIELD

This disclosure is directed to devices for holding components in desired locations. More specifically, this disclosure is directed to non-rotating flexure bearings with enhanced dynamic stability for cryocoolers and other devices.

BACKGROUND

Cryocoolers are often used to cool various components to extremely low temperatures. For example, cryocoolers can be used to cool focal plane arrays in different types of imaging systems. It is often necessary or desirable to secure certain components of a cryocooler in fixed positions relative to other components of the cryocooler. This may be needed, for example, to ensure proper operation of the cryocooler or to reduce disturbances in the cryocooler or in an overall system. One approach to securing components of a cryocooler involves the use of flexure bearings that connect moving mechanisms of the cryocooler to a support structure. A conventional flexure bearing includes arms arranged in a spiral pattern, where the arms extend between a moving mechanism of the cryocooler and the support structure.

SUMMARY

This disclosure provides non-rotating flexure bearings with enhanced dynamic stability for cryocoolers and other devices.

In a first embodiment, an apparatus includes an outer hub and an inner hub, where the hubs are configured to be secured to a support structure and to a device. The apparatus also includes multiple sets of flexure arms connecting the outer hub and the inner hub, where each set of flexure arms includes symmetric flexure arms. In addition, the apparatus includes multiple bridges, where each bridge connects one of the flexure arms in one set of flexure arms to one of the flexure arms in an adjacent set of flexure arms.

In a second embodiment, a system includes a device, a support structure, and a flexure bearing configured to connect the device to the support structure. The flexure bearing includes an outer hub and an inner hub, where the hubs are configured to be secured to the support structure and to the device. The flexure bearing also includes multiple sets of flexure arms connecting the outer hub and the inner hub, where each set of flexure arms includes symmetric flexure arms. The flexure bearing further includes multiple bridges, where each bridge connects one of the flexure arms in one set of flexure arms to one of the flexure arms in an adjacent set of flexure arms.

In a third embodiment, a method includes coupling a flexure bearing to a support structure and a device in order to mount the device to the support structure. The flexure bearing includes an outer hub and an inner hub, where the hubs are secured to the support structure and to the device. The flexure bearing also includes multiple sets of flexure arms connecting the outer hub and the inner hub, where each set of flexure arms includes symmetric flexure arms. The flexure bearing further includes multiple bridges, where each bridge connects one of the flexure arms in one set of flexure arms to one of the flexure arms in an adjacent set of flexure arms.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged system.

Figure 1:
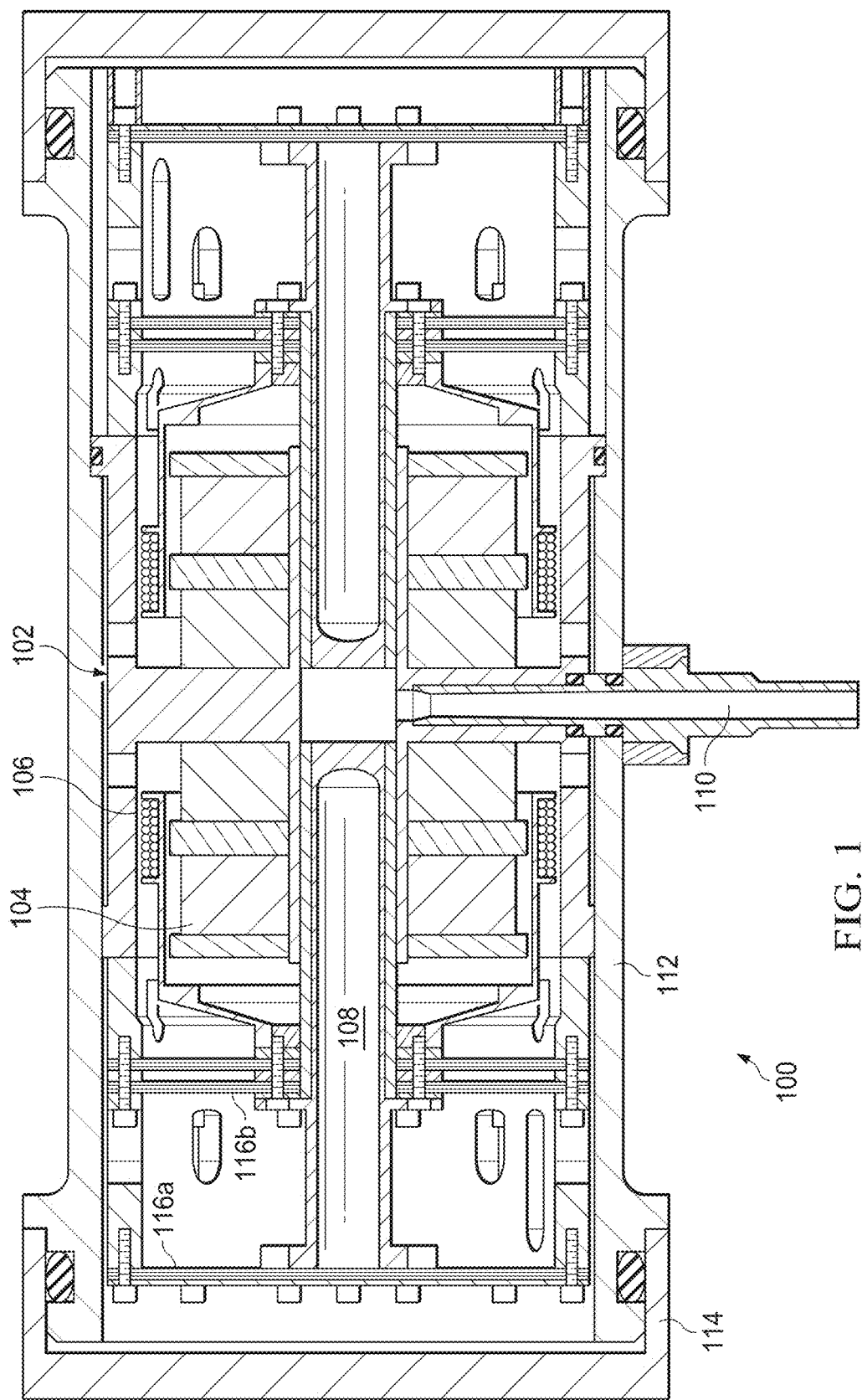
FIG. 1 illustrates an example system with non-rotating flexure bearings according to this disclosure.

FIG. 1 illustrates an example system 100 with non-rotating flexure bearings according to this disclosure. As shown in FIG. 1, the system 100 includes a compressor 102, which can be used with other components (not shown) to form a cryocooler. A cryocooler generally represents a device that can cool other components to cryogenic temperatures or other extremely low temperatures. In FIG. 1, the components on the left side of FIG. 1 are mirrored on the right side of FIG. 1, and for convenience only the components on one side of the compressor 102 are identified using reference numbers.

In this example, the compressor 102 includes a motor magnet 104 and a motor coil 106 that operate to cause movement of a compressor piston 108. The piston 108 strokes back and forth during each compression cycle, which causes repeated pressure changes in a fluid that is provided through a transfer line 110. Controlled expansion and contraction of the fluid creates a desired cooling of one or more components. Note that this represents one specific implementation of a compressor 102 and that any other suitable compressor can be used in the system 100.

The compressor 102 and other components of a cryocooler (such as an expander and balancer units) are positioned within a housing 112, which is sealed by an end cap 114. The housing 112 represents a support structure to which the compressor 102 is mounted. The housing 112 includes any suitable structure for encasing or otherwise protecting a cryocooler (or portion thereof). The end cap 114 represents any suitable structure for closing a cryocooler housing.

In order to help precisely control the positioning of the compressor 102, multiple flexure bearings are provided to mount the compressor 102 to the housing 112. In this example, there are multiple stacks 116a-116b of flexure bearings. Each stack 116a-116b can include one or multiple flexure bearings. As described in more detail below, each flexure bearing generally includes an outer hub, an inner hub, and flexure arms. The outer and inner hubs can be secured to a support structure (such as the housing 112) and to a device that includes a movable component (such as the compressor 102 or other portion of a cryocooler). The flexure arms couple the outer and inner hubs. Symmetric sets of flexure arms are configured to help prevent rotation of the device when the device is displaced, and the flexure arms in different sets are connected together by bridge elements. Example embodiments of the flexure bearings are described below.

As noted above, one conventional flexure bearing includes arms arranged in a spiral pattern, where the arms extend between a moving component of a cryocooler and a support structure. While this conventional flexure bearing can generally hold the moving component of the cryocooler at a desired location, one problem with this design is that it allows the moving component to rotate. Rotation of the moving component can cause disturbances in the operation of a larger system, such as exported forces and torques that are often referred to as "exported disturbances" of the cryocooler.

The non-rotating flexure bearings described in this patent document help to both secure components of a cryocooler in place and reduce or eliminate rotation of the components. For example, the use of the non-rotating flexure bearings could result in an almost purely linear motion for a moving mechanism, which allows the moving mechanism to be balanced more completely than a similar mechanism with even a small degree of rotation.

Among other things, use of the non-rotating flexure bearings helps to reduce or minimize off-axis vibrations and moments of components. Such off-axis vibrations and moments are inherent in spiral-designed flexure bearings. While the components of a cryocooler may still be disturbed in their positions, the use of the non-rotating flexure bearings can allow extremely low levels of exported disturbances from the cryocooler to be obtained. This can be useful, for instance, in helping to keep the compressor pistons 108 aligned with their respective bores.

Moreover, as noted above, the flexure arms in different sets of a flexure bearing are connected together using bridge elements. Depending on the implementation, such as when a non-rotating flexure bearing is thin, it is possible for unwanted harmonic motions of the flexure arms to occur. Connecting the flexure arms in different sets together using the bridge elements creates a dissipative mechanism for the unwanted dynamics, providing enhanced dynamic stability.

The cryocooler can be used to cool any suitable components. For example, the cryocooler could be used to cool a focal plane array, which represents an image sensing device used in various types of applications including infrared sensors. However, the cryocooler could be used to cool any other suitable components of a system. Other example uses for the cryocooler include cooling computing components (such as processors), radio frequency components in telecommunication and deep space communication equipment (such as RF filters), components in magnetic resonance imaging (MRI) systems, and superconducting electronics. These uses are for illustration only, and the cryocooler can be used to cool components in any other type of system.

Note that the compressor 102 in FIG. 1 represents a portion of a cryocooler, and the cryocooler could include various other components, such as an expander and balancer units. The expander, balancer units, or other components of the cryocooler could also include moving components, and one or more non-rotating flexure bearings could be used with those moving components in the same or similar manner as that described above.

Although FIG. 1 illustrates one example of a system 100 with non-rotating flexure bearings, various changes may be made to FIG. 1. For example, while described as coupling a compressor 102 to a housing 112, one or more flexure bearings could be used to help secure any other suitable components to any suitable support structure. The non-rotating flexure bearings are not limited to use with cryocoolers.

Figure 2:
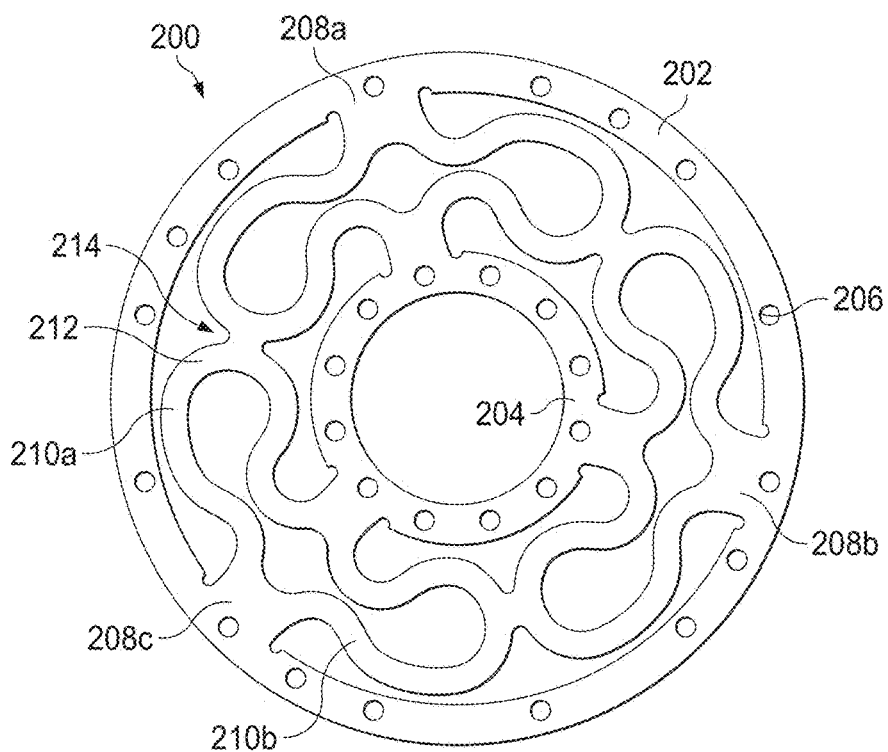
FIGS. 2 and 3 illustrate an example non-rotating flexure bearing with enhanced dynamic stability according to this disclosure.
Figure 3:
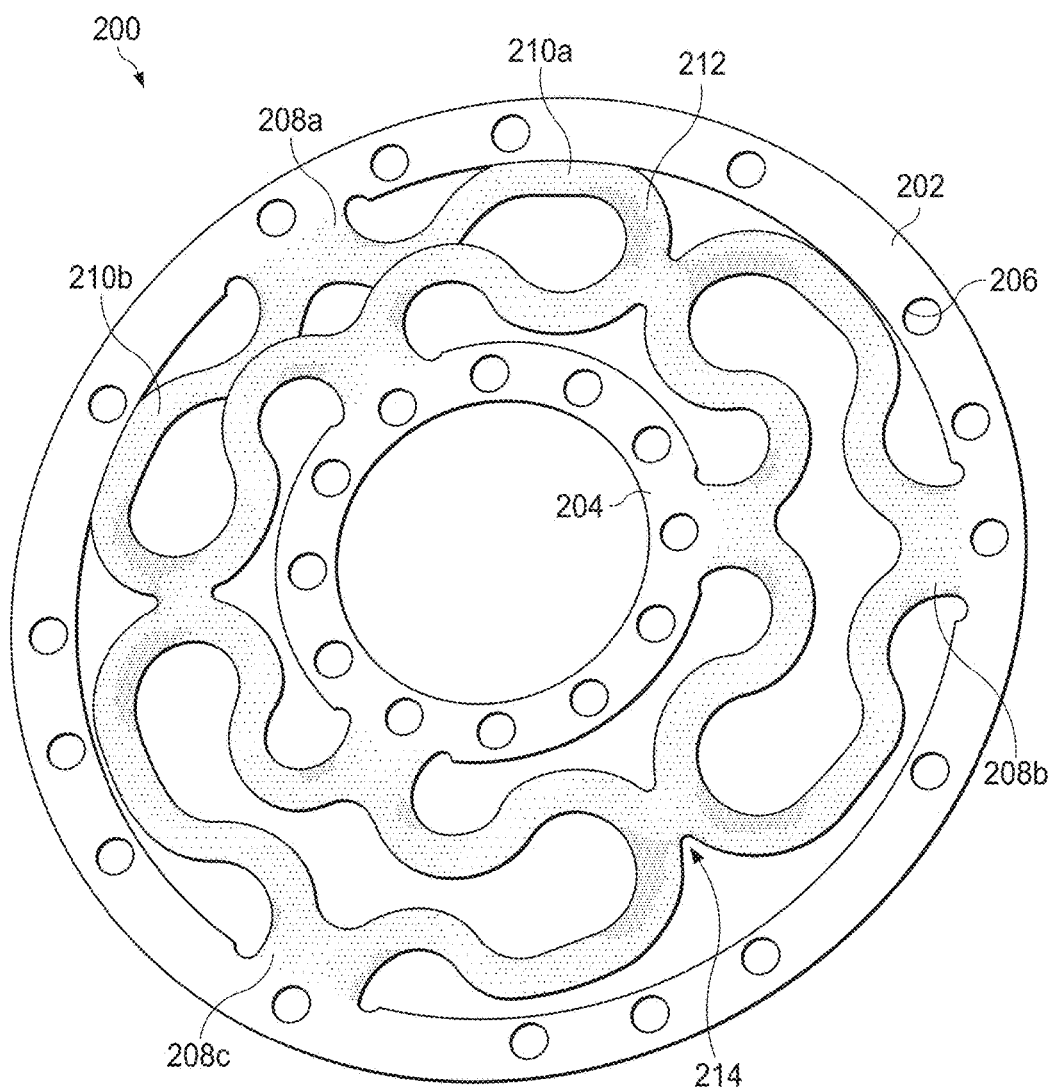

FIGS. 2 and 3 illustrate an example non-rotating flexure bearing 200 with enhanced dynamic stability according to this disclosure. The flexure bearing 200 could be used in any suitable system. For example, the flexure bearing 200 could represent the flexure bearings contained within the stacks 116a-116b in the system 100 of FIG. 1.

As shown in FIG. 2, the flexure bearing 200 includes an outer hub 202 and an inner hub 204. The outer hub 202 can be secured to a support structure, and the inner hub 204 can be secured to a device (such as a compressor 102 or other component of a cryocooler). Alternatively, the outer hub 202 can be secured to a device, and the inner hub 204 can be secured to a support structure. The flexure bearing 200 thereby helps to secure the cryocooler component or other device at a desired location relative to the support structure. While the device may be temporarily displaced due to external forces, the flexure bearing 200 helps to quickly return the device to the desired location. As shown in the example of FIG. 1, multiple flexure bearings 200 can be used (such as in a stack) to help tune the spring stiffness and thus the natural frequency of the moving mechanism in the cryocooler or other device.

Note that the circular shapes of the hubs 202-204 are for illustration only. Each hub 202-204 of the flexure bearing 200 could have any suitable size, shape, and dimensions. In particular embodiments, the outer hub 202 has an inner diameter of about 4.7 inches (about 119.38 mm) and an outer diameter of about 5.4 inches (about 137.16 mm), and the inner hub 204 has an inner diameter of about 1.375 inches (about 34.925 mm) and an outer diameter of about 2.42 inches (about 61.468 mm).

Each hub 202-204 includes various openings 206. The openings 206 are arranged to receive connectors for coupling the flexure bearing 200 to the support structure and to the cryocooler component or other device. For example, each opening 206 could allow a bolt to be inserted through a hub 202-204 in order to secure the flexure bearing 200 to the support structure or to the cryocooler component or other device. Each opening 206 could have any suitable size, shape, and dimensions. Note, however, that any other suitable mechanism could be used to secure the flexure bearing 200.

As shown in FIG. 2, the flexure bearing 200 also includes three sets 208a-208c of flexure arms. The sets 208a-208c of flexure arms couple the outer hub 202 and the inner hub 204. As a result, when the flexure bearing 200 is secured to a support structure and to a cryocooler component or other device, the sets 208a-208c of flexure arms help to hold the cryocooler component or other device at a desired location. Even though external forces can cause deformation of the flexure arms and movement of the cryocooler component or other device, the flexure arms operate to return the device to the desired location. In the example shown in FIG. 2, there are three sets 208a-208c of flexure arms positioned radially around a central axis at a spacing of about 120°.

Each flexure set 208a-208c includes two flexure arms 210a-210b. The flexure arms 210a-210b in each set 208a-208c are mirror images of one another, meaning the flexure arm 210a in one set is a mirror image of the flexure arm 210b in that set. The flexure arms 210a-210b in each set 208a-208c are therefore symmetric, meaning the load path connecting the hubs 202-204 is symmetric. As can be seen in FIG. 2, each flexure arm 210a-210b is connected to the outer hub 202 and follows a winding path with various "S" curves to the inner hub 204. The path followed by each flexure arm 210a-210b generally includes a "loop back" region 212 where the flexure arm 210a-210b substantially reverses direction within the flexure bearing 200. Note that while each flexure arm 210a-210b is shown here as being curved along most or all of its path, this need not be the case.

In the following discussion of various flexure bearings, reference is made to an "axial" direction. The "axial" direction refers to the direction along a central axis of a flexure bearing, meaning along the central axis of the flexure bearing 200 that is perpendicular to the image shown in FIG. 2. This is in contrast to a "radial" direction, which refers to the direction from the central axis of the flexure bearing 200 out towards the outer hub 202 in FIG. 2.

As noted above, the outer hub 202 of the flexure bearing 200 can be coupled to a support structure, and a cryocooler component or other device can be coupled to the inner hub 204 of the flexure bearing 200. In this configuration, the flexure arms can flex and twist, but the inner hub 204 does not rotate significantly (or at all) when the cryocooler component or other device is displaced axially along the central axis of the flexure bearing 200. As shown in FIG. 3, this is because deformation of one flexure arm 210a in a set 208a-208c is associated with a substantially opposite deformation of the other flexure arm 210b in the same set 208a-208c. In other words, due to the symmetry of the flexure arms 210a-210b in each set 208a-208c, the inner hub 204 does not rotate as a function of displacement. As a result, the deformations of the flexure arms 210a-210b within each set 208a-208c substantially cancel each other, resulting in little or no rotation of the inner hub 204. Note that if the outer hub 202 of the flexure bearing 200 is coupled to a device and the inner hub 204 of the flexure bearing 200 is coupled to a support structure, the same mechanism can help to reduce or minimize rotation of the outer hub 202.

Moreover, the design of the flexure arms 210a-210b in each set 208a-208c can be chosen so that the natural frequency of the flexure bearing 200 (with one hub 202-204 secured to a cryocooler component or other device) does not couple with the operating frequency of the cryocooler component or other device. For example, the natural frequency of the flexure arms 210a-210b could be around 80 Hz to around 120 Hz. If used with a compressor 102 having an operating frequency of about 40 Hz to about 60 Hz, the flexure arms 210a-210b are not susceptible to dynamic amplification (or are susceptible to an extremely small extent).

However, it is still possible for unwanted harmonic motions to occur in the flexure arms 210a-210b, such as unwanted harmonic modes that occur in the flexure arms 210a-210b. For example, when the flexure bearing 200 is thin, the stiffness of the flexure bearing 200 decreases as one of the hubs 202 and 204 displaces, which can result in a lower natural frequency of the flexure arms 210a-210b. When the lower natural frequency intersects the operating frequency of a cryocooler or other system, undesirable results can occur. For instance, excitation of these resonant modes by the intended movement of the mounted device can interfere with the proper operation of a cryocooler or other system. As a result, dynamic stability problems can occur in certain combinations of flexure thicknesses (flexure stiffness) and cryocooler operating frequencies.

To help resolve this issue, multiple bridges 214 connecting pairs of flexure arms are provided in the flexure bearing 200. For each set 208a-208c, one bridge 214 couples the flexure arm 210a in that set 208a-208c to the flexure arm 210b in a first adjacent set 208a-208c, and another bridge 214 couples the flexure arm 210b in that set 208a-208c to the flexure arm 210a in a second adjacent set 208a-208c. In the example shown in FIG. 2, there are three bridges 214 that are used to connect the adjacent flexure arms in the different sets 208a-208c, although different numbers of bridges 214 could be used with different numbers of flexure arm sets.

The use of the bridges 214 increases the dynamic stability of the flexure bearing 200 by helping to reduce or eliminate the possibility of unwanted harmonic motions in the flexure bearing 200. The bridges 214 slightly increase the overall stiffness of the flexure bearing 200 while providing a dissipative mechanism for unwanted dynamics. By bridging the flexure arms of the non-rotating flexure bearing 200, energy that previously would have gone into unwanted resonant oscillations is instead dissipated through the straining of the bridges 214. Thus, the bridges 214 increase the flexure arms' stiffness and prevent excitation of unwanted resonant modes.

The flexure bearing 200 could be formed from any suitable material(s). In some embodiments, the flexure bearing 200 can be formed from stainless steel or flapper valve steel, such as BÖHLER-UDDEHOLM 716 UHB stainless steel. The flexure bearing 200 can also have any suitable size, shape, and dimensions. As particular examples, the flexure bearing 200 could have a thickness of about 0.008 inches (about 0.2032 mm), about 0.01 inches (about 0.254 mm), about 0.022 inches (about 0.5588 mm), or about 0.0315 inches (about 0.8 mm). The flexure bearing 200 can further be formed in any suitable manner, such as by machining a solid piece of material into the proper form, molding material into the proper form, or welding or otherwise connecting various components manufactured separately.

In particular embodiments, the flexure bearing 200 is designed with the following details in mind. Maximum axial displacement of the inner hub 204 could be about ±0.3 inches (about ±7.62 mm) to about ±0.4 inches (about ±10.16 mm) as measured from the neutral position of the inner hub 204. Also, maximum stress placed on any portion of the flexure bearing 200 could be under a specified threshold, such as 62 kilopounds per square inch (ksi). This can be done to help ensure an adequate operational lifetime for the flexure bearing 200. Note, however, that these values are examples only and that other values could be used.

The bridges 214 could be formed from any suitable material(s) and in any suitable manner In some embodiments, the bridges 214 are formed of the same material(s) as the remainder of the flexure bearing 200 and can be formed integral with the flexure arms 210a-210b. In particular embodiments, the flexure bearing 200 could be formed by stamping or otherwise processing a metal sheet or other material, and the bridges 214 could be formed at the same time the other elements of the flexure bearing 200 are formed. In other embodiments, the bridges 214 could be formed separate from the flexure arms 210a-210b and then attached to the flexure arms 210a-210b. Note that the bridges 214 need not represent portions of the flexure bearing 200 separate from the flexure arms 210a-210b and could represent areas where the flexure arms 210a-210b join together.

In the example shown in FIG. 2, each of the bridges 214 is located between the "loop back" regions 212 of two different flexure arms 210a-210b in two different sets 208a-208c of the flexure bearing 200. Each of the bridges 214 could therefore extend linearly between two flexure arms. In particular embodiments, the bridges 214 are located at or near midpoints of the flexure arms 210a-210b. However, bridges between flexure arms could have a wide variety of other shapes and sizes.

Figure 4:
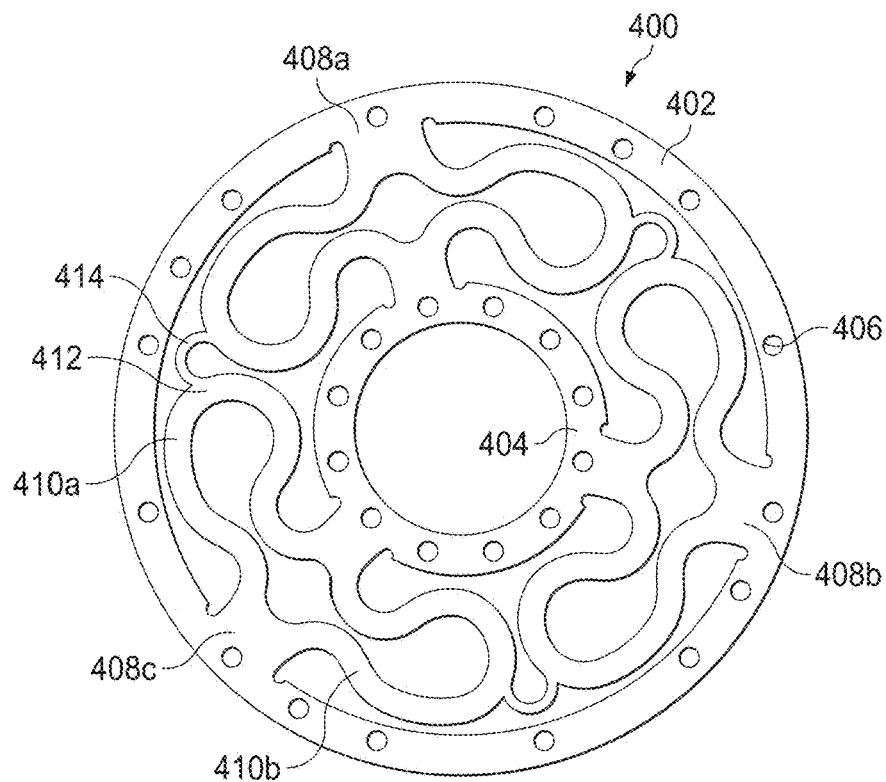
FIGS. 4 and 5 illustrate other example non-rotating flexure bearings with enhanced dynamic stability according to this disclosure.
Figure 5:
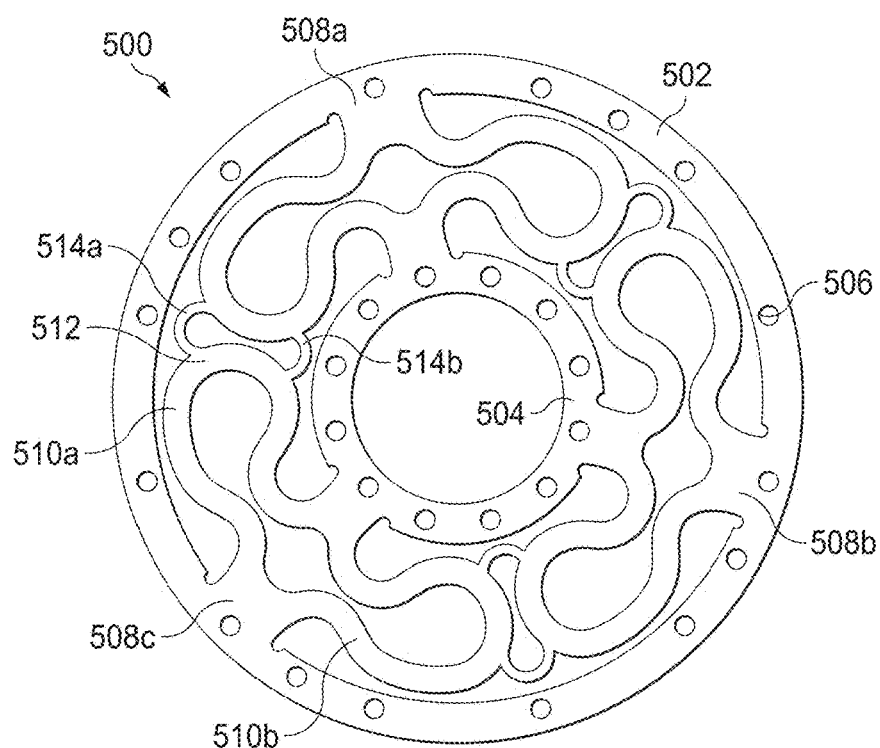

FIGS. 4 and 5 illustrate other example non-rotating flexure bearings 400 and 500 with enhanced dynamic stability according to this disclosure. Each of these flexure bearings 400 and 500 could be used in any suitable system. For example, each of these flexure bearings 400 and 500 could represent the flexure bearings contained within the stacks 116a-116b in the system 100 of FIG. 1.

As shown in FIG. 4, the flexure bearing 400 includes an outer hub 402, an inner hub 404, and openings 406. The flexure bearing 400 also includes three sets 408a-408c of flexure arms 410a-410b, and each flexure arm includes a "loop back" region 412. In the example shown in FIG. 4, there are three sets 408a-408c of flexure arms positioned radially around a central axis at a spacing of about 120°. As with the flexure bearing 200, the flexure arms 410a-410b help to hold a cryocooler component or other device at a desired location while reducing or minimizing rotation of the device.

In addition, the flexure bearing 400 includes bridges 414 connecting pairs of flexure arms. In particular, for each set 408a-408c, one bridge 414 couples the flexure arm 410a in that set 408a-408c to the flexure arm 410b in a first adjacent set 408a-408c, and another bridge 414 couples the flexure arm 410b in that set 408a-408c to the flexure arm 410a in a second adjacent set 408a-408c. In the example shown in FIG. 4, there are three bridges 414 that are used to connect the adjacent flexure arms in the different sets 408a-408c, although different numbers of bridges 414 could be used with different numbers of flexure arm sets.

In this example, the bridges 414 denote structures that extend between two flexure arms in a curved or arched path. In this particular example, the bridges 414 are curved into an approximate "U" shape. However, other shapes could also be used for the bridges 414, such as a "V" shape or other generally symmetric shape. As noted above with respect to the bridges 214, the bridges 414 could be formed from any suitable material(s) and in any suitable manner For example, the bridges 414 could be formed of the same material(s) as the remainder of the flexure bearing 400 and can be formed integral with the flexure arms 410a-410b, such as by stamping or otherwise processing a metal sheet or other material. In other embodiments, the bridges 414 could be formed separate from the flexure arms 410a-410b and then attached to the flexure arms 410a-410b.

While the use of one bridge between two flexure arms is shown in FIGS. 2 and 4, other embodiments could use multiple bridges between flexure arms in a flexure bearing. For example, as shown in FIG. 5, the flexure bearing 500 includes an outer hub 502, an inner hub 504, and openings 506. The flexure bearing 500 also includes three sets 508a-508c of flexure arms 510a-510b, and each flexure arm includes a "loop back" region 512. In the example shown in FIG. 5, there are three sets 508a-508c of flexure arms positioned radially around a central axis at a spacing of about 120°. As with the flexure bearings 200 and 400, the flexure arms 510a-510b help to hold a cryocooler component or other device at a desired location while reducing or minimizing rotation of the device.

In addition, the flexure bearing 500 includes bridges 514a-514b connecting pairs of flexure arms. In particular, for each set 508a-508c, two bridges 514a-514b couple the flexure arm 510a in that set 508a-508c to the flexure arm 510b in a first adjacent set 508a-508c, and another two bridges 514a-514b couple the flexure arm 510b in that set 508a-508c to the flexure arm 510a in a second adjacent set 508a-508c. In the example shown in FIG. 5, there are three sets of bridges 514a-514b that are used to connect the adjacent flexure arms in the different sets 508a-508c, although different numbers of bridges 514 could be used with different numbers of flexure arm sets.

In this example, the bridges 514a-514b denote structures that extend between two flexure arms in a curved or arched path. In this particular example, the bridges 514a-514b are curved into an approximate "U" shape. However, other shapes could also be used with the bridges 514a-514b, such as a "V" shape or other generally symmetric shape. As noted above with respect to the bridges 214 and 414, the bridges 514a-514b could be formed from any suitable material(s) and in any suitable manner For example, the bridges 514a-514b could be formed of the same material(s) as the remainder of the flexure bearing 500 and can be formed integral with the flexure arms 510a-510b, such as by stamping or otherwise processing a metal sheet or other material. In other embodiments, the bridges 514a-514b could be formed separate from the flexure arms 510a-510b and then attached to the flexure arms 510a-510b.

In the flexure bearing 200 of FIG. 2, the bridges 214 are linear between adjacent flexure arms. As a result, the bridges 214 increase the stiffness of the flexure bearing 200 and provide less travel for the flexure arms compared to the flexure bearings 400 and 500. In contrast, in the flexure bearing 400 of FIG. 4, the bridges 414 are curved between adjacent flexure arms. Because of this, the flexure bearing 400 is not as stiff and the flexure arms can travel more compared to the flexure bearing 200. In the flexure bearing 500 of FIG. 5, there are multiple curved bridges 514a-514b between adjacent flexure arms. Thus, the flexure bearing 500 may have less overall stiffness than the flexure bearing 200, and the flexure bearing 500 could dissipate more energy to prevent unwanted oscillations than the flexure bearing 400. Thus, various characteristics of the bridges used in a flexure bearing (such as the number of bridges, the shape of the bridges, and/or the location of the bridges) could be selected to provide the desired effect in the flexure bearing.

In the flexure bearings described above, the flexure arms in each set of flexure arms are mirror images of one another and therefore symmetric. This helps to reduce or minimize rotation of each flexure bearing's inner or outer hub (depending on which is secured to a support structure) since displacement of one flexure arm is substantially counteracted by the displacement of the mirror-image flexure arm. Moreover, the bridging of the flexure arms means energy that previously would have gone into unwanted resonant oscillations of the flexure arms is dissipated through the straining of the bridges.

Note that while FIGS. 2 through 5 illustrate examples of the shapes that flexure arms in a flexure bearing could have, a number of other shapes could be used for the flexure arms. For example, U.S. Pat. No. 9,285,073 (which is hereby incorporated by reference in its entirety) discloses different flexure bearings with various shapes for the flexure arms of those flexure bearings. Any of these flexure arm shapes could be used in a flexure bearing and linked by bridges according to this disclosure. In general, a wide variety of shapes could be used for the flexure arms of a flexure bearing and linked by bridges, as long as the flexure arms are substantially symmetric to help prevent rotation of a device when the device is displaced axially.

Although FIGS. 2 through 5 illustrate examples of non-rotating flexure bearings, various changes may be made to FIGS. 2 through 5. For example, the number of flexure arms is for illustration only and can change as needed. As a particular example, depending on the size of a flexure bearing, the flexure bearing could include more than three sets of flexure arms. Also, the flexure arms need not be curved and could be formed from substantially straight sections.

Figure 6:
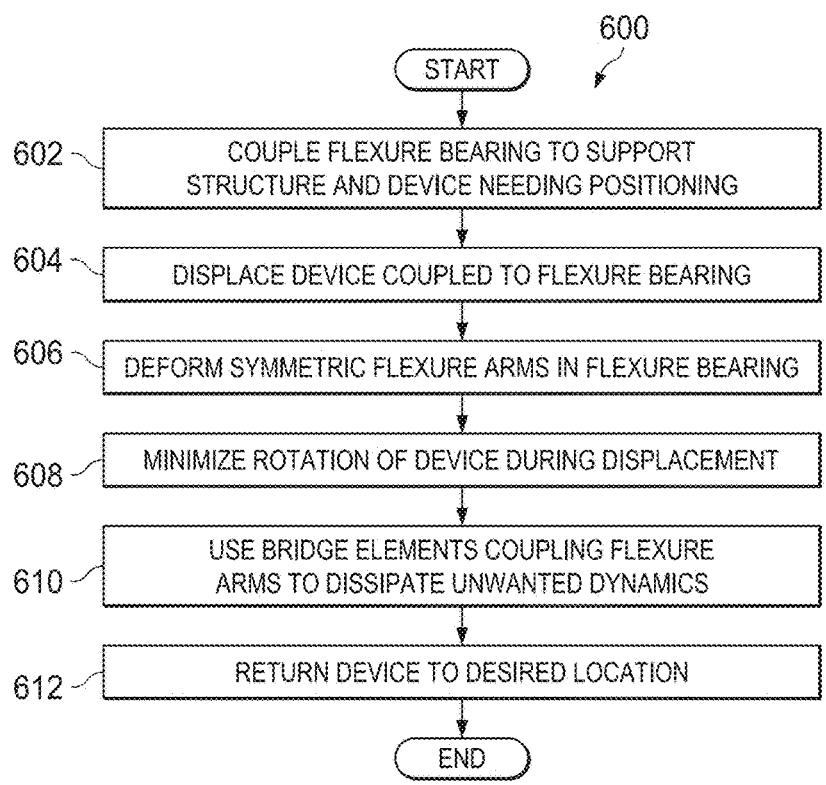
FIG. 6 illustrates an example method for using a non-rotating flexure bearing with enhanced dynamic stability according to this disclosure.

FIG. 6 illustrates an example method 600 for using a non-rotating flexure bearing with enhanced dynamic stability according to this disclosure. For ease of explanation, the method 600 is described with respect to the flexure bearing 200 being used in the system 100 of FIG. 1. However, the method 600 could involve the use of any other flexure bearings (such as the flexure bearings 400 and 500) and could be used with any other suitable system.

As shown in FIG. 6, at least one flexure bearing is coupled to a support structure and to a device needing positioning at step 602. This could include, for example, inserting bolts or other connectors through openings 206 of the flexure bearing 200. This can be done to secure the flexure bearing 200 to a compressor 102 or other cryocooler component or device and to a housing 112.

The device coupled to the flexure bearing is displaced at step 604. This could include, for example, external forces causing the compressor 102 to be displaced axially along the central axis of the flexure bearing 200. As a result, symmetric flexure arms in the flexure bearing are deformed at step 606. This could include, for example, rotation of a hub 202-204 caused by deforming one flexure arm being substantially cancelled by the rotation of the hub 202-204 caused by deforming the mirror-image flexure arm. This helps to reduce or minimize rotation of the device during the displacement at step 608. Moreover, bridge elements coupling the flexure arms dissipate unwanted dynamics in the flexure bearing at step 610. This could include, for example, the straining of the bridges 214 dissipating energy that previously would have gone into unwanted resonant oscillations of the flexure arms 210a-210b.

The device returns substantially to its desired resting location at step 612. This could include, for example, the flexure bearing 200 causing the compressor 102 to return to a neutral position once the external force that caused the displacement is removed. The presence of the bridges 214 here helps to reduce or eliminate the excitation of resonant modes of the flexure bearing 200 during this process.

Although FIG. 6 illustrates one example of a method 600 for using a non-rotating flexure bearing with enhanced dynamic stability, various changes may be made to FIG. 6. For example, while shown as a series of steps, various steps in FIG. 6 could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
    an outer hub and an inner hub, the hubs configured to be secured to a support structure and to a device;
    multiple sets of flexure arms connecting the outer hub and the inner hub, each set of flexure arms including symmetric flexure arms; and
    multiple bridges each connecting one of the flexure arms in one set of flexure arms to one of the flexure arms in an adjacent set of flexure arms, the bridges coplanar with the flexure arms, the outer hub, and the inner hub.

2. The apparatus of claim 1, wherein the bridges are configured such that straining of the bridges dissipates energy to prevent harmonic motions of the flexure arms.

3. The apparatus of claim 2, wherein the bridges increase an overall stiffness of the apparatus compared to a stiffness of the apparatus without the bridges.

4. The apparatus of claim 1, wherein each bridge extends linearly between the flexure arms connected by that bridge.

5. The apparatus of claim 1, wherein each bridge follows a curved or arched path between the flexure arms connected by that bridge.

6. The apparatus of claim 1, wherein:
    at least two bridges connect one of the flexure arms in each set to a flexure arm in a first adjacent set; and
    at least two other bridges connect another of the flexure arms in each set to a flexure arm in a second adjacent set.

7. The apparatus of claim 1, wherein the sets of flexure arms are positioned radially around a central axis of the apparatus.

8. The apparatus of claim 1, wherein the symmetric flexure arms in each set are configured such that twisting of one flexure arm in one set is substantially counteracted by twisting of another flexure arm in that set.

9. A system comprising:
a device;
a support structure; and
a flexure bearing configured to connect the device to the support structure, the flexure bearing comprising:
an outer hub and an inner hub, the hubs configured to be secured to the support structure and to the device;
multiple sets of flexure arms connecting the outer hub and the inner hub, each set of flexure arms including symmetric flexure arms; and
multiple bridges each connecting one of the flexure arms in one set of flexure arms to one of the flexure arms in an adjacent set of flexure arms, the bridges coplanar with the flexure arms, the outer hub, and the inner hub.

10. The system of claim 9, wherein the bridges are configured such that straining of the bridges dissipates energy to prevent harmonic motions of the flexure arms.

11. The system of claim 10, wherein the bridges increase an overall stiffness of the flexure bearing compared to a stiffness of the flexure bearing without the bridges.

12. The system of claim 9, wherein each bridge extends linearly between the flexure arms connected by that bridge.

13. The system of claim 9, wherein each bridge follows a curved or arched path between the flexure arms connected by that bridge.

14. The system of claim 9, wherein:
at least two bridges connect one of the flexure arms in each set to a flexure arm in a first adjacent set; and
at least two other bridges connect another of the flexure arms in each set to a flexure arm in a second adjacent set.

15. The system of claim 9, wherein the symmetric flexure arms in each set are configured such that twisting of one flexure arm in one set is substantially counteracted by twisting of another flexure arm in that set.

16. The system of claim 9, wherein:
the device comprises a movable component of a cryocooler; and
the support structure comprises a housing of the cryocooler.

17. A method comprising:
coupling a flexure bearing to a support structure and a device in order to mount the device to the support structure;
wherein the flexure bearing comprises:
an outer hub and an inner hub, the hubs secured to the support structure and to the device;
multiple sets of flexure arms connecting the outer hub and the inner hub, each set of flexure arms including symmetric flexure arms; and
multiple bridges each connecting one of the flexure arms in one set of flexure arms to one of the flexure arms in an adjacent set of flexure arms, the bridges coplanar with the flexure arms, the outer hub, and the inner hub.

18. The method of claim 17, wherein the bridges are configured such that straining of the bridges dissipates energy to prevent harmonic motions of the flexure arms.

19. The method of claim 17, wherein each bridge extends linearly between the flexure arms connected by that bridge.

20. The method of claim 17, wherein each bridge follows a curved or arched path between the flexure arms connected by that bridge.

* * * * *